Oct. 8, 1935.  H. N. ATWOOD  2,016,273
BUILT-UP COMPOSITE CELLULAR STRUCTURE
Filed Sept. 14, 1934  2 Sheets-Sheet 1
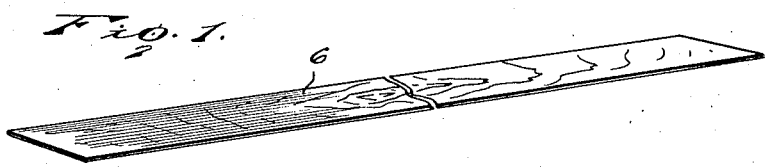
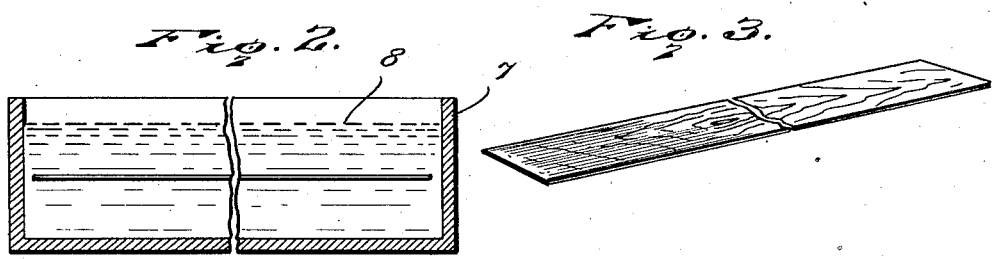
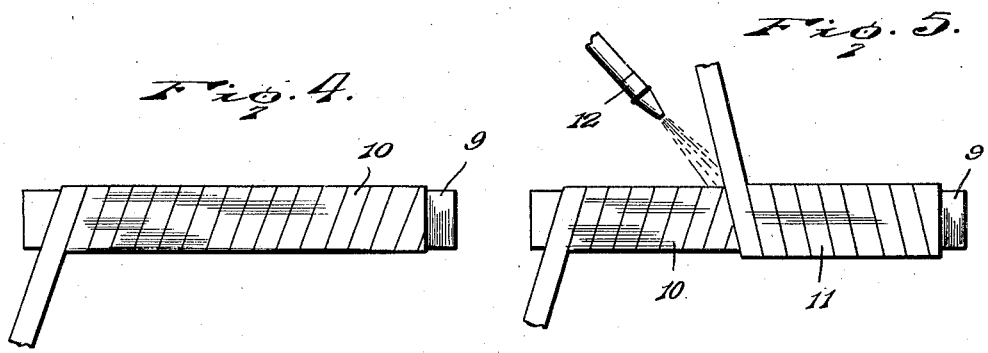
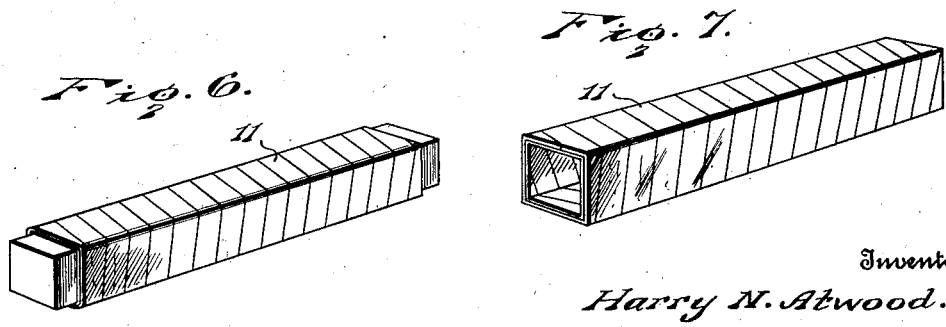
Inventor
Harry N. Atwood.
By Lacey & Lacey, Attorneys Oct. 8, 1935.  H. N. ATWOOD  2,016,273
BUILT-UP COMPOSITE CELLULAR STRUCTURE
Filed Sept. 14, 1934    2 Sheets-Sheet 2
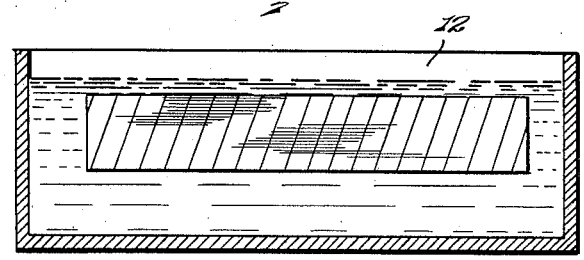
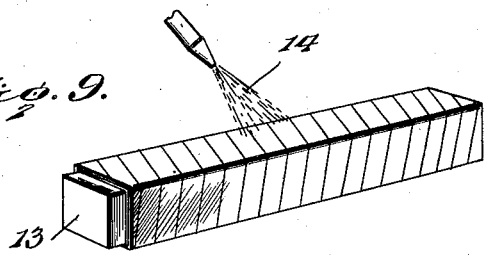
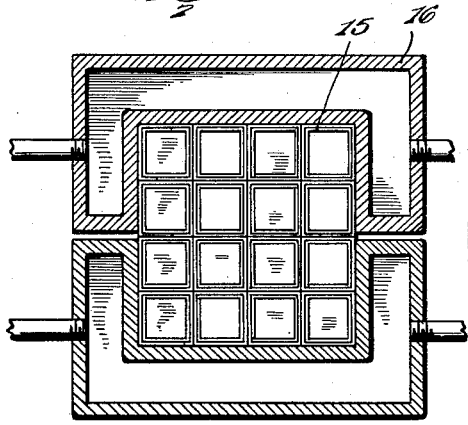
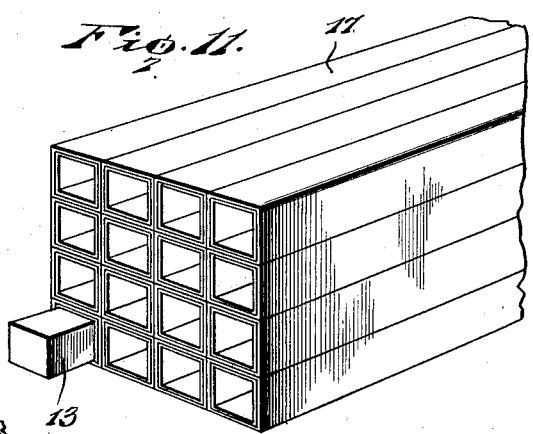
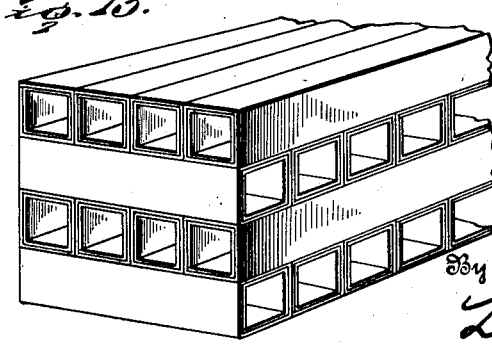
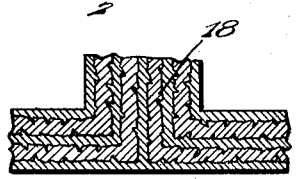
Inventor
Harry N. Atwood.
By Lacey & Lacey,
Attorneys Patented Oct. 8, 1935

2,016,273

UNITED STATES PATENT OFFICE 2,016,273

BUILT-UP COMPOSITE CELLULAR STRUCTURE

Harry N. Atwood, South Lyndeboro, N. H.

Application September 14, 1934, Serial No. 744,068

10 Claims. (Cl. 154—2)

This invention relates to a built up cellular structure and method of making the same.

The object of the invention is to provide a composite cellular structure, the component parts of which may be readily fabricated and assembled to form a built up structural unit which is light in weight and strong and durable in construction, thereby rendering it especially adapted for use in the construction of all kinds of air craft, marine craft, building construction, and for various other purposes.

A further object of the invention is to provide a structural unit formed of laminated wood veneer tubes, impregnated with cellulosic plastic material and having their contacting faces united and securely bonded together to form a reinforced cellular structure of predetermined shape.

The invention consists in immersing dry, or partially dry strips of wood veneer or other fibrous material in an acetone solution containing a small percentage of cellulosic plastic material so as to cause the cellulosic plastic material to impregnate the fibers and interstices of the wood and cover both sides of the veneer, drying said veneer strips so that the cellulosic plastic material remaining on the surface becomes normally hard and tough, winding the strips thus treated around a suitable shaping mandrel in superposed spiral layers to form a laminated tube and preferably during the winding operation spraying or otherwise applying cellulosic plastic material to the exposed surfaces of the veneer strips to bond the superposed veneer strips together; allowing the tube thus treated to dry on the shaping mandrel and then removing the tube from the mandrel and immersing said tube in a bath of cellulosic plastic material or otherwise applying cellulosic plastic material thereto so as to be sure that all exposed surfaces are thoroughly impregnated and covered with the plastic material; drying the tube on a mandrel and subsequently spraying or otherwise treating the exterior surface thereof with cellulosic material and while the plastic material is still moist or wet bundling several of the tubes together in any desired shape or formation and subjecting them to the action of heat and pressure.

In the accompanying drawings forming a part of this specification and in which similar numerals of reference indicate corresponding parts in all the views of the drawings:

Figure 1 is a perspective view, partly broken away, of a strip of wood veneer or other fibrous material from which tubes are made.

Figure 2 is a vertical sectional view showing the wood veneer strip immersed in an acetone solution.

Figure 3 is a perspective view after the strip is removed from the acetone bath and allowed to dry.

Figure 4 is a side elevation showing a veneer strip, constituting the lower layer or ply of the tube, being wound upon a shaping mandrel.

Figure 5 is a similar view showing the manner of coiling the upper layer or ply of veneer around the lower ply while subjecting the veneer to the action of a spray of cellulosic material.

Figure 6 is a perspective view showing a wound tube in position on a shaping mandrel to effect the drying thereof.

Figure 7 is a similar view showing the tube removed from the mandrel.

Figure 8 is a vertical sectional view showing the tube immersed in an acetone bath.

Figure 9 is a perspective view showing the tube after it is removed from the acetone bath and dryed and being sprayed with cellulosic plastic material prior to the assembling operation.

Figure 10 is a vertical sectional view showing several of the tubes assembled in superposed relation and being subjected to heat and pressure.

Figure 11 is a perspective view of the finished product, one of the finishing mandrels being shown partially withdrawn therefrom.

Figure 12 is an enlarged detail sectional view of adjoining tubes showing the bonding action of the cellulosic material.

Figure 13 is a perspective view illustrating a different manner of assembling the tubes.

According to the present invention, I take thin strips 6 of fibrous material, preferably natural wood veneer, of any desired length, width and thickness, although it is preferred that the strips be approximately one inch wide and one-forty-eighth of an inch thick to insure thorough impregnation when treated in the manner hereinafter described. In actual practice I have found that the best results are obtained when the wood veneer is dry or partially dry. The strip or strips 6 are then placed in a tank 7 of an acetone solution 8 containing approximately five percent, by weight, of solid cellulosic plastic material, such as cellulosic acetate, nitrate or cellulose ester and allowed to remain therein until the cellulose material substantially impregnates the pores and interstices of the wood and covers both surfaces thereof. The strip is then removed from the tank 7 and allowed to dry so that the cellulosic plastic material remaining on the surface of the wood and entering the pores and interstices thereof becomes normally hard and tough. The strip of veneer thus treated is then wound or coiled around a shaping mandrel 9 preferably rectangular in shape, although a mandrel of any other cross sectional shape may be employed if desired. The wood veneer strips are preferably wound in spiral superposed layers 10 with the adjacent edges of the veneer strips of the foundation layer preferably abutting and with the next succeeding layer wound in a reverse direction and overlapping the foundation layer and in intimate bonding contact therewith so as to form a tubular member 11. Any number of layers of veneer may be employed according to the strength and stability desired. During the winding operation all exposed surfaces of the veneer strips are preferably subjected to the action of a spray or coat of cellulosic plastic material from a nozzle 12, or, if desired, the plastic material may be applied with a brush so as to render adjacent surfaces wet or moist and thus insure intimate bonding contact or adhesion between the strips. The tube thus formed is then allowed to thoroughly dry on the mandrel and after the drying of the tube has been effected said tube is immersed in or otherwise subjected to the action of an acetone bath 12 of the nature previously referred to so that the entire exterior and interior surfaces of the tube will be thoroughly covered with cellulosic plastic material. The tube is then removed from the acetone bath and placed on a finishing mandrel 13 and allowed to dry after which it is again subjected to a spray or coat 14 of cellulosic plastic material so as to cause the exterior of the tube to become wet or moist and while in a wet or moist condition several of said tubes on the mandrel are assembled in superposed relation with their adjacent surfaces contacting with each other, as indicated at 15, and said tubes thus assembled placed in a suitable press 16 and subjected to the conjunctive action of heat and pressure whereby the several tubes will be thoroughly bonded together. The structural unit 17 thus formed is then removed from the press and the finishing mandrels 13 removed from the tubes. If desired, the exterior of the structural unit 17 may be given a finishing coat of cellulosic plastic material so as to be sure that all cracks and crevices are covered and also to give the product a smooth neat finish. By reference to Figure 12 of the drawings, it will be noted that when the product is subjected to the conjunctive action of heat and pressure, the cellulosic plastic material will be further forced and set into the fibers and pores of the wood, as indicated at 18, so that the wood laminations of each tube will be intimately bonded together, as well as the exterior surfaces of adjacent tubes, and an exceptionally strong, tough and stable structural unit will result.

In Figure 13 of the drawings I have illustrated a modified form of the invention in which the tubes of one layer are arranged at substantially right angles to the tubes of adjacent layers so as to break joint therewith, the construction being otherwise substantially identical with that shown in Figure 11 of the drawings.

It will, of course, be understood that any desired number of layers of veneer may be employed according to the nature of the units desired and the strength and stability necessary for the particular use or purpose. It will further be understood that said units may be made in different sizes and shapes and the individual tubular members may be of any desired cross sectional formation without departing from the spirit of the invention. A structural unit constructed in accordance with the present invention is light in weight and tough and durable in texture so that it is particularly adapted for use in the fabrication of the fuselage, wings and other parts of air and water craft. However, it will be understood that it is not desired to limit the invention to any particular use as said product may be employed with excellent results in the construction of buildings or wherever a structural unit of this character is found necessary or desirable.

Having thus described the invention, what is claimed as new is:

1. A composite structural unit comprising a plurality of tubular members each formed of superposed laminations of fibrous material impregnated with cellulosic plastic material and wound in spiral form, said tubular members being disposed in superposed layers with the tubular members of each layer having bonding enagagement with each other and with the tubular members of adjacent layers.

2. A composite structural unit comprising a plurality of tubular members each formed of superposed plies of wood veneer impregnated with and having a surface coating of cellulosic plastic material, said wood veneer being wound in spiral form with the wood veneer plies overlapping and said tubular members being disposed in superposed layers with the tubular members of each layer having bonding engagement with each other and with the tubular members of adjacent layers.

3. A reinforced laminated tubular member for structural units comprising strips of wood veneer impregnated with cellulosic plastic material, said strips being wound in spiral form to form superposed plies with the wood veneer of adjacent plies overlapping whereby the several plies will be thoroughly bonded together.

4. A reinforced laminated tubular member for structural units comprising strips of relatively thin wood veneer of uniform width impregnated with an acetone solution containing cellulosic plastic material, said strips of veneer being wound in spiral form to form superposed layers with the strips of one layer disposed at an angle to and overlapping the strips of an adjacent layer and intimately bonded therewith to form a tube, and cellulosic plastic material covering the interior and exterior surfaces of the tube.

5. A composite structural unit comprising a plurality of tubular members each formed of superposed laminations of fibrous material impregnated with cellulosic plastic material and wound in spiral form with one lamina of fibrous material disposed at an angle to another lamina and intimately bonded therewith, said tubular members being disposed in superposed layers with the tubes of adjacent layers arranged in vertical alinement with each other to produce a cellular structure and with the tubular members of each layer having bonding engagement with each other and with the tubular members of adjacent layers.

6. The method of making a hollow structural unit which consists in impregnating a strip of fibrous material with an acetone solution containing cellulosic plastic material, drying the strip, winding the strip on a shaping mandrel in superposed layers to form a tubular member, applying cellulosic plastic material to the strip during the winding operation and subjecting the tube thus formed to the action of heat and pressure.

7. The method of making a hollow structural unit which consists in impregnating a strip of wood veneer with an acetone solution containing cellulosic plastic material, drying the strip to cause the cellulosic plastic material to become hard and tough, winding the strip of wood veneer on a shaping mandrel in superposed layers with the wood veneer of one layer wound in a reverse direction to the veneer of an adjacent layer and during the winding operation applying cellulosic plastic material thereto to cause the layers of veneer to adhere and produce a tube, drying the tube and after the tube is dried immersing said tube in the acetone solution, removing the tube from the solution and spraying the exterior thereof with cellulosic plastic material and while said cellulosic material is still wet assembling several of the tubes on finishing mandrels in superposed relation and subjecting them to heat and pressure.

8. The method of making a cellular structural unit which consists in impregnating a relatively thin strip of reasonably dry wood veneer with an acetone solution containing cellulosic plastic material, drying the wood veneer strip to cause the cellulosic material on the surface of the wood veneer to become hard and tough, winding said wood veneer strip on a shaping mandrel in superposed spiral layers to form a tube and during the winding operation applying cellulosic plastic material to the veneer strip to cause close adhesion between the layers of veneer, drying the tube thus formed, removing the tube from the mandrel and immersing said tube in the acetone solution, removing the tube from the solution and drying the same, placing the tube on a finishing mandrel and applying cellulosic plastic material to the exterior of the tube and while the exterior surface of said tube is still moist assembling several of said tubes on finishing mandrels one above the other in superposed layers to form a composite structural unit, subjecting the said unit to the action of heat and pressure, and subsequently removing the finishing mandrels.

9. A composite structural unit comprising a plurality of tubular members formed of fibrous material impregnated with an acetone solution containing cellulosic material, said tubular members being assembled in a predetermined form and having intimate bonding engagement with each other.

10. A composite structural unit comprising a tubular member formed of fibrous material impregnated with an acetone solution containing cellulosic material to provide a protective surface coating for the exterior and interior of said tubular member.

HARRY N. ATWOOD. [L. S.]